US012694997B2

United States Patent
(12) United States Patent
Moon et al.

(10) Patent No.: US 12,694,997 B2
(45) Date of Patent: Jul. 28, 2026

(54) PASSIVE CONDENSATION TANK COOLING SYSTEM OF PASSIVE AUXILIARY FEEDWATER SYSTEM

(71) Applicant: KOREA HYDRO & NUCLEAR POWER CO., LTD., Gyeongju-si (KR)

(72) Inventors: Ho Rim Moon, Sejong (KR); Sang Hee Kang, Daejeon (KR); Huiun Ha, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 418 days.

(21) Appl. No.: 18/017,277

(22) PCT Filed: Jul. 13, 2021

(86) PCT No.: PCT/KR2021/008976
§ 371 (c)(1),
(2) Date: Jan. 20, 2023

(87) PCT Pub. No.: WO2022/019559
PCT Pub. Date: Jan. 27, 2022

(65) Prior Publication Data
US 2023/0268089 A1 Aug. 24, 2023

(30) Foreign Application Priority Data
Jul. 23, 2020 (KR) ........................ 10-2020-0091358

(51) Int. Cl.
*G21C 15/18* (2006.01)
*G21C 15/243* (2006.01)

(52) U.S. Cl.
CPC ......... *G21C 15/182* (2013.01); *G21C 15/243* (2013.01)

(58) Field of Classification Search
None
See application file for complete search history.

(56) References Cited

U.S. PATENT DOCUMENTS 4,404,165 A 9/1983 Hesky et al.
10,043,596 B2 * 8/2018 Kwon .................... G21C 15/18

FOREIGN PATENT DOCUMENTS

JP S58221301 A * 12/1983
JP 2013195318 A * 9/2013

(Continued)

*Primary Examiner* — Lily C Garner
(74) *Attorney, Agent, or Firm* — You & IP, LLC

(57) ABSTRACT

Proposed is a passive condensation tank cooling system of a passive auxiliary feedwater system, the cooling system allowing a passive condensation tank to include an inner wall and an outer wall and a cooling means to be interposed between the inner wall and the outer wall, thereby suppressing the increase in the temperature of the heat exchange water in a condensation process in the passive condensation tank. To this end, proposed is the passive condensation tank cooling system of a passive auxiliary feedwater system, the cooling system including: a passive condensation tank having a water storage space to store heat-exchange water; and a condenser arranged to be immersed in the heat-exchange water in the passive condensation tank, wherein the passive condensation tank includes the outer and inner walls providing the water storage space and a cooling means interposed between the walls for absorbing heat of the heat-exchange water.

5 Claims, 3 Drawing Sheets

(56) References Cited

FOREIGN PATENT DOCUMENTS

| | | | | | |
|---|---|---|---|---|---|
| JP | 2014-173984 | A | | 9/2014 | |
| JP | 2016-505158 | A | | 2/2016 | |
| JP | 7480419 | B2 | * | 5/2024 | ............. G21C 15/18 |
| KR | 20010076565 | A | * | 8/2001 | |
| KR | 10-1022164 | B1 | | 3/2011 | |
| KR | 101160771 | B1 | * | 6/2012 | |
| KR | 101224023 | B1 | * | 1/2013 | ........... G21C 15/257 |
| KR | 20140047452 | A | * | 4/2014 | ............... G21D 1/02 |
| KR | 101405666 | B1 | * | 6/2014 | ............. G21C 15/02 |
| KR | 10-1459550 | B1 | | 11/2014 | |
| KR | 10-1499641 | B1 | | 3/2015 | |
| KR | 10-2016-0118537 | A | | 10/2016 | |
| KR | 101665551 | B1 | * | 10/2016 | |
| KR | 10-1742644 | B1 | | 6/2017 | |
| WO | 2014-137447 | A2 | | 12/2014 | |
| WO | 2014-137447 | A3 | | 12/2014 | |

* cited by examiner

PASSIVE CONDENSATION TANK COOLING SYSTEM OF PASSIVE AUXILIARY FEEDWATER SYSTEM

TECHNICAL FIELD

The present disclosure relates to a passive condensation tank cooling system of a passive auxiliary feedwater system and, more particularly, to a passive condensation tank cooling system of a passive auxiliary feedwater system, the cooling system suppressing a rise in the temperature of heat exchange water during condensation in the passive condensation tank, thereby improving the cooling performance of the passive auxiliary feedwater system.

BACKGROUND ART

A nuclear power plant is a facility that generates steam by transferring heat to water passing through a steam generator using thermal energy generated by nuclear fission of fuel and obtains electrical energy by operating turbines and a generator with the steam generated above. A nuclear power plant is to be provided with facilities that allow a reactor core that holds nuclear fuel and a reactor coolant system that transfers heat energy generated at a nuclear reactor to a secondary side to be safely operated within a design range, thereby maintaining the safety of nuclear power plant and preventing diffusion of radioactive materials.

To accomplish this, a nuclear power plant is equipped with an engineered safety feature system so as to safely shut the power plant down in an event of an accident. The engineered safety feature system includes a containment system, an emergency core cooling system, and a passive auxiliary feedwater system.

As an example of a passive auxiliary feedwater system, FIG. 1 shows a passive secondary side condensation system of a light water reactor disclosed in Korean Patent No. 10-1022164. With reference to FIG. 1, the passive secondary side condensation system of a conventional light water reactor, the system including: a steam generator 10 to generate steam by heat of the nuclear reactor; a main steam line 11 to supply heat from the steam generator 10 to a turbine side; and a main water supply line 12 in which water that steam passing through the turbine is condensed by heat exchange with cooling water is recovered to the steam generator 10. In addition, the above system is to cut off steam supply to the turbine side when the operation of the nuclear reactor is stopped and to allow, after condensing the steam that is introduced through the steam supply line 13 that is branched off from the main steam line 11 by heat exchange in a condenser 20 immersed in the passive condensation tank 30, condensate water to be merged into the main water supply line 12 through a condensate water recovery line 14 connected to an outlet of the condenser 20, wherein disclosed is a configuration of a backflow prevention unit 40 arranged for preventing the backflow of condensate water in the condensate water recovery pipe 14.

According to such a passive secondary side condensation system, without being provided with a separate active means such as a pump, the steam generated in the steam generator 10 by a natural convection manner is condensed in the condenser 20 and then returned to the steam generator 10 to cool the nuclear reactor, thereby having an advantage of preventing overheating of the nuclear reactor in case of an accident at a nuclear power plant.

However, in the above conventional passive auxiliary feedwater system, in a process of condensing water being produced through the condenser 20, the heat-exchange water stored in the passive condensation tank 30 increases in temperature while being heat-exchanged with the condenser 20 through which high-temperature steam passes. Accordingly, there may be a problem in that the heat exchange efficiency of the condenser 20 is lowered. That is, the conventional passive auxiliary feedwater system may reduce the heat exchange efficiency of the condenser 20 due to a water temperature rise of the heat-exchange water, so the amount of condensate water generated may be reduced. Accordingly, there may be a problem in that the cooling performance of the passive auxiliary feedwater system is reduced in the event of a nuclear reactor accident.

DOCUMENTS OF RELATED ART

Patent Document

Korean Patent No. 10-1022164

DISCLOSURE

Technical Problem

Accordingly, the present disclosure has been made keeping in mind the above problems occurring in the related art, and an objective of the present disclosure is to provide a passive condensation tank cooling system of a passive auxiliary feedwater system, which may provide a cooling means in the passive condensation tank to suppress a water temperature rise of heat exchange water in a heat exchange process through a condenser, thereby improving the cooling performance of the passive auxiliary feedwater system.

Technical Solution

In order to accomplish the above objective, there may be provided a passive condensation tank cooling system of a passive auxiliary feedwater system, the system including: a passive condensation tank having a water storage space to store heat-exchange water; and a condenser arranged to be immersed in the heat-exchange water in the passive condensation tank, wherein the passive condensation tank includes an outer wall and an inner wall spaced apart from the outer wall providing the water storage space, and a cooling means between the outer wall and inner wall for absorbing heat of the heat-exchange water is interposed.

At this time, the outer wall may be made of concrete, and the inner wall may be made of metal.

In addition, the cooling means may be a fluid.

At this time, the system may further include a circulation flow path to circulate the cooling means to the outside of the passive condensation tank, wherein a heat exchanger to allow the cooling means to be heat-exchanged and a circulation pump to provide power to circulate the fluid may be arranged in the circulation flow path.

Advantageous Effects

As described above, a passive condensation tank cooling system of a passive auxiliary feedwater system according to the present disclosure allows the passive condensation tank to include an inner wall and an outer wall and a cooling means to be interposed between the inner wall and the outer wall, thereby suppressing an increase in the temperature of the heat exchange water in a heat exchange process in the passive condensation tank. Furthermore, the passive condensation tank cooling system of a passive auxiliary feedwater system has an effect of improving cooling performance of the passive auxiliary feedwater system through a condenser in an event of a nuclear reactor accident.

In addition, the present disclosure has the effect of extending a cooling function of the passive auxiliary feedwater system and improving the cooling performance.

BEST MODE

Terms or words used in the present specification and claims are not limited to usual or dictionary meanings and, on the basis of a principle that the inventors may properly define a concept of the terms to explain the invention thereof in the best way, should be interpreted as meaning and concept consistent with the technical spirit of the present disclosure.

Hereinafter, a passive condensation tank cooling system (hereinafter referred to as "cooling system") of a passive auxiliary feedwater system according to an exemplary embodiment of the present disclosure will be described with reference to FIG. 2 attached hereto. Prior to the description, same numerals are marked together with respect to the same components as those in conventional art, respectively, and detailed descriptions will be omitted.

The cooling system includes the passive condensation tank composed of double walls, and a cooling means interposed between the double walls. Accordingly, the cooling system suppresses an increase in the temperature of the heat exchange water in the passive condensation tank through the cooling means so that the heat exchange performance of the condenser is continuously maintained, thereby improving the cooling performance of the passive auxiliary feedwater system.

Figure 1:
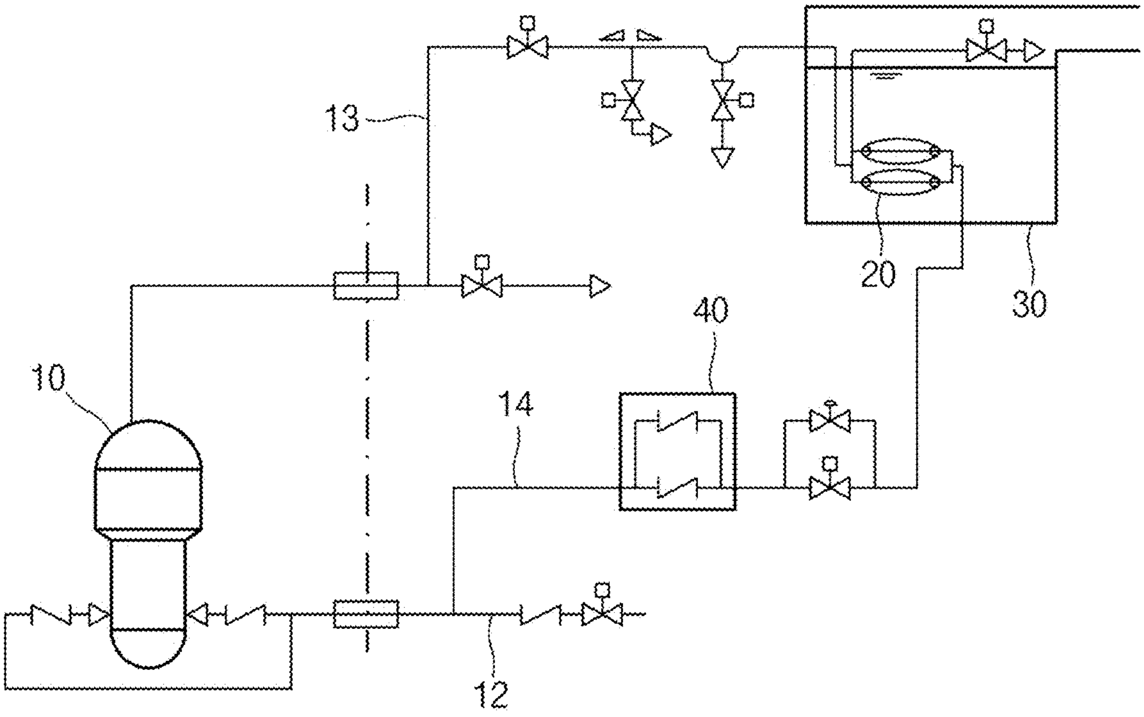
FIG. 1 is a system diagram showing a passive auxiliary feedwater system of a nuclear power plant according to conventional art.
Figure 2:
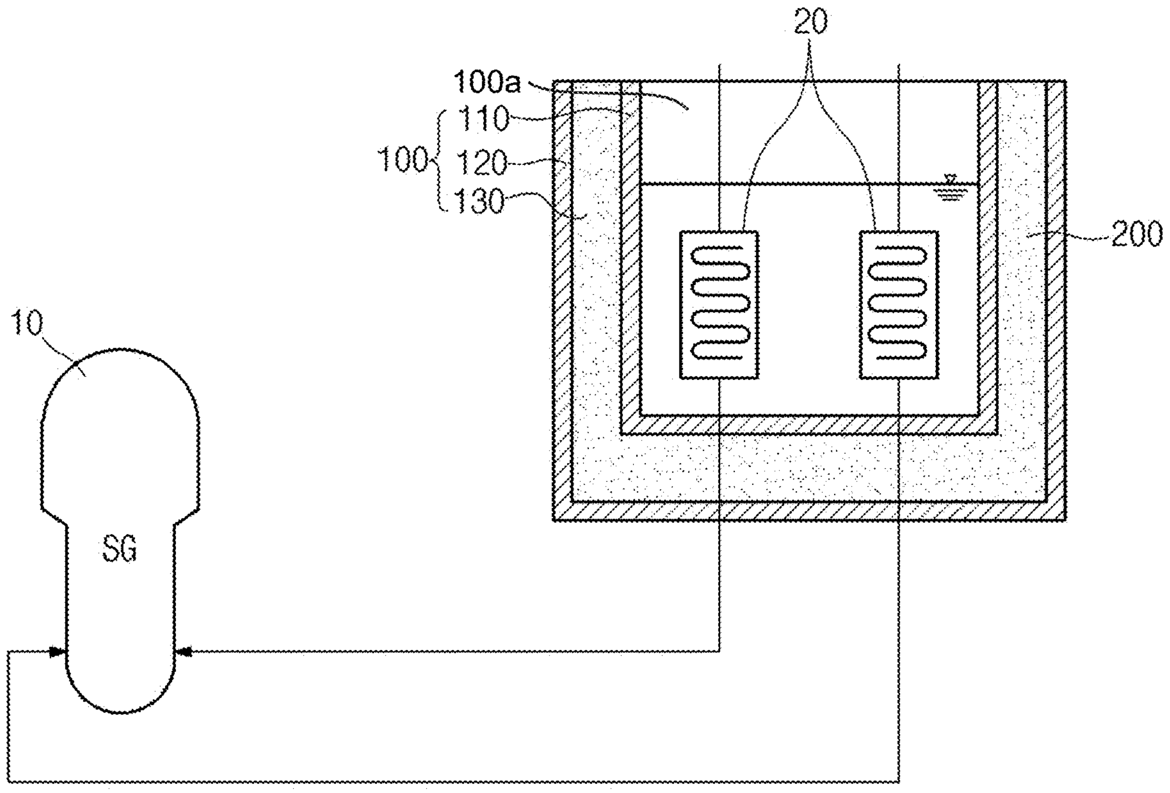
FIG. 2 is a diagram schematically showing only main parts of a passive condensation tank cooling system of a passive auxiliary feedwater system according to an exemplary embodiment of the present disclosure.

As shown in FIG. 2, a steam generator 10 and cooling system are provided in the passive auxiliary feedwater system, and the cooling system includes a passive condensation tank 100 and a cooling means 200.

The passive condensation tank 100 is to generate condensate water by condensing high-temperature steam supplied from the steam generator 10 and provides a water storage space 100*a* in which the condenser 20 is accommodated and heat-exchange water may be stored. That is, the heat-exchange water is stored in the water storage space 100*a* of the passive condensation tank 100, and the condenser 20 is arranged to be immersed in the heat-exchange water. The passive condensation tank 100 includes an inner wall 110 and an outer wall 120. The inner wall 110 provides the water storage space 100*a* and is made of a metal material. The metal material of the inner wall 110 is not particularly limited but may be a metal material having high heat transfer efficiency. The outer wall 120 constitutes an exterior wall of the passive condensation tank 100. The outer wall 120 may be a concrete material having high rigidity. The material of the outer wall is also not limited to concrete and will be good when provided with a material with high rigidity. The outer wall 120 and the inner wall 110 are provided to be spaced apart from each other, whereby a predetermined space portion 130 is provided between the outer wall 120 and the inner wall 110. The space portion 130 is provided between each side part of the outer wall 120 and each side part of the inner wall 110, and a bottom part of the outer wall 120 and a bottom part of the inner wall 110.

The cooling means 200 serves to suppress the water temperature of the heat-exchange water from rising in a process that the condenser 20 condenses high-temperature steam in the water storage space 100*a* and is interposed in a space portion 130 provided between the outer wall 120 and the inner wall 110. In general, when a condensation action is performed in the condenser 20, the temperature of the heat-exchange water rises rapidly and reaches a maximum of 370 K (96.85° C.). Therefore, according to a rise of the water temperature of the heat-exchange water, there may occur a situation where not only the condensation efficiency of the condenser 20 decreases but also, as the heat-exchange water evaporates, a level of the heat-exchange water decreases to require the heat-exchange water to be additionally filled. Accordingly, the present disclosure may suppress an increase in the temperature of the heat-exchange water through the cooling means 200 to maintain the condensation efficiency of the condenser 20, thereby improving the cooling performance of the passive auxiliary feedwater system. The cooling means 200 may be provided with a refrigerant having a high boiling point and residual heat absorbing performance rather than being limited to a specific material. The refrigerant may be provided in various ways and may be provided in various refrigerants besides molten salt, water, molten salt+water, and the like.

Meanwhile, the present disclosure may be to circulate the cooling means 200 in and out of the space portion 130, thereby increasing the cooling efficiency of the cooling means 200. This is presented as another embodiment of the present disclosure and will be described with reference to FIG. 3 attached hereto. Prior to the description, the same configuration as same numerals are marked together with respect to the same components as those in the exemplary embodiment, respectively, and detailed descriptions will be omitted.

Figure 3:
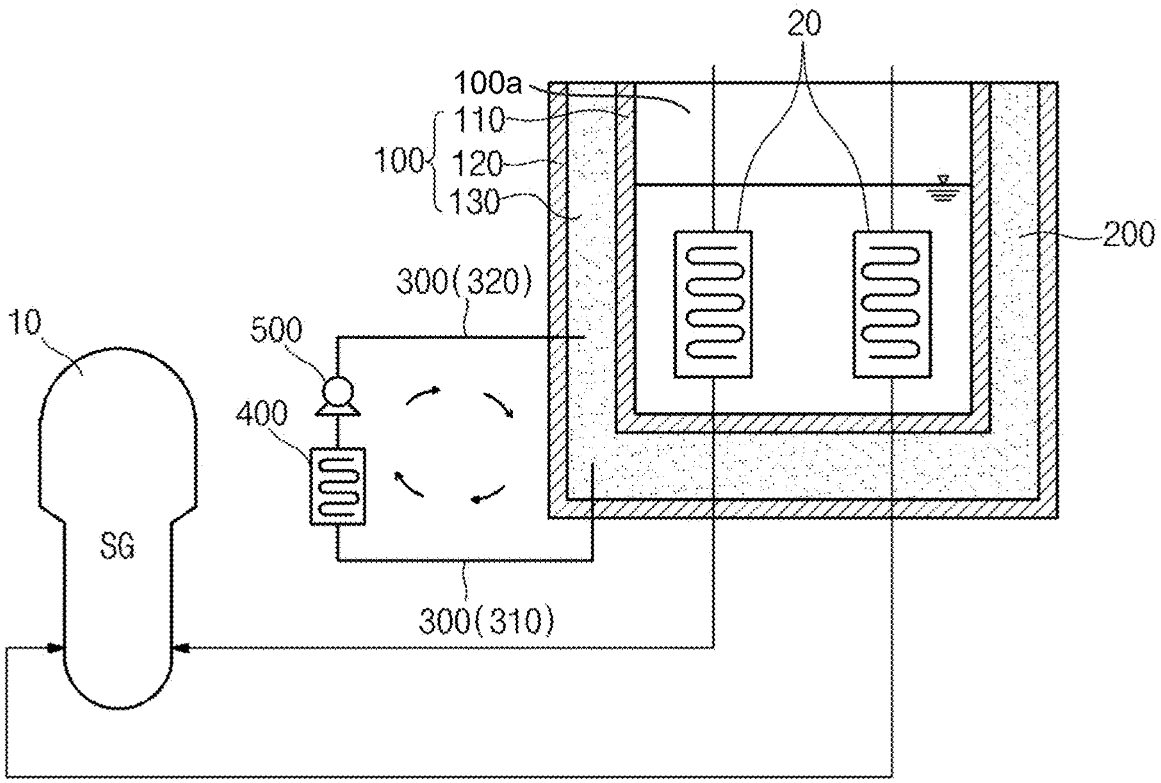
FIG. 3 is a view schematically showing only main parts of a passive condensation tank cooling system of a passive auxiliary feedwater system according to another embodiment of the present disclosure.

As shown in FIG. 3, a cooling system according to another embodiment includes a passive condensation tank 100, a circulation flow path 300, a heat exchanger 400, and a circulation pump 500.

The circulation flow path 300 is to circulate the cooling means 200 of the space portion 130 provided between the inner wall 110 and the outer wall 120 to the outside of the passive condensation tank 100 and includes a discharge flow path 310 and an inflow flow path 320. The discharge flow path 310 provides a pipeline through which the cooling means 200 of the space part 130 is discharged to the outside, and the inflow flow path 320 provides a pipeline through which the cooling means 200 having been discharged through the discharge flow path 310 is re-introduced into the space part 130.

The heat exchanger 400 serves to cool the cooling means 200 in a process the cooling means 200 suppresses an increase in the temperature of the heat-exchange water and is arranged in the circulation flow path 300. The heat exchanger 400 is arranged between the discharge flow path 310 and the inflow flow path 320 in order to allow the cooling means 200 discharged from the discharge flow path 310 to be sent to the inflow flow path 320.

The circulation pump 500 may be good, provided any configuration thereof is capable of pumping and circulating the cooling means in the circulation flow path 300.

Hereinafter, a cooling action of the passive auxiliary feedwater system in which the cooling system as described above is arranged will be described.

When an accident occurs during normal operation of a nuclear power plant, steam supply from the steam generator 10 to the turbine is cut off, and steam supply is accomplished through the steam supply pipe 13 to the condenser 20 of the passive condensation tank 30.

The high-temperature steam is discharged through an inlet of the condenser 20 to an outlet of the condenser 20, and in such a process, the high-temperature steam is heat-exchanged with the heat-exchange water stored in the passive condensation tank 30 through the condenser 20, thereby generating condensate water. At this time, the water temperature of the heat-exchange water becomes to rise as heat-exchanged with high-temperature steam, and the cooling means 200 takes away heat from the heat-exchange water, thereby suppressing an increase in the water temperature of the heat-exchange water.

In addition, in such a process, the circulation pump 500 generates pumping power to circulate the cooling means 200 through the circulation flow path 300 to the space portion 130 and the outside of the passive condensation tank 100. As the cooling means 200 circulates through the heat exchanger 400 to the space portion 130, the temperature rise of the cooling means 200 is minimized so that the decrease in cooling efficiency due to the increase in the temperature of the heat exchange water can be minimized.

As described so far, the passive condensation tank cooling system of the passive auxiliary feedwater system according to the present disclosure allows the passive condensation tank 100 to include the inner wall 110 and the outer wall 120 and the cooling means 200 to be interposed between the inner wall 110 and the outer wall 120, thereby suppressing the increase in the temperature of the heat exchange water in a condensation process in the passive condensation tank 100. Accordingly, the passive condensation tank cooling system of the passive auxiliary feedwater system may improve the cooling performance of the passive auxiliary feedwater system and contribute to securing a long-term cooling function in the event of an extreme disaster accident.

Although the present disclosure has been described in detail with respect to the described embodiments, it is obvious to those skilled in the art that various changes and modifications are possible within the scope of the technical spirit of the present disclosure, and it is natural that such changes and modifications belong to the appended claims.

The invention claimed is:

1. A passive condensation tank cooling system of a passive auxiliary feedwater system, the cooling system comprising:

- a passive condensation tank including:
  - outer walls defining an exterior of the passive condensation tank, the outer walls including:
    - outer lateral side walls, and
    - an outer bottom wall;
  - inner walls disposed inside the outer walls, the inner walls including:
    - inner lateral side walls, and
    - an inner bottom wall,
    - wherein the inner lateral side walls are and spaced apart from the outer lateral side walls, and the inner bottom wall is spaced apart from the outer bottom wall;
  - a water storage space formed by the inner walls and storing heat-exchange water; and
  - a refrigerant storage space formed between the outer walls and the inner walls and extending along the inner lateral side walls and the inner bottom wall, the refrigerant storage space storing being configured to store a refrigerant,
  - wherein the water storage space and the refrigerant storage space are separated by the inner walls such that the heat-exchange water and the refrigerant remain isolated from each other even when the refrigerant storage space is completely filled with the refrigerant;
- a condenser arranged inside the water storage space to be immersed in the heat-exchange water;
- a steam supply pipe connected to an inlet of the condenser to allow steam to be introduced into the condenser; and
- a condensate water recovery pipe connected to an outlet of the condenser to allow water condensed by the condenser to flow out of the condenser,
- wherein the refrigerant in the refrigerant storage space is configured to absorb heat of the heat-exchange water in the water storage space.

2. The cooling system of claim 1, wherein the outer walls are made of concrete, and the inner walls are made of metal.

3. The cooling system of claim 1, wherein the refrigerant is a fluid including one or more among molten salt and water.

4. The cooling system of claim 1, further comprising:

- a heat exchanger disposed outside the passive condensation tank;
- a circulation flow path between the refrigerant storage space and the heat exchanger;
- a circulation pump disposed in the circulation flow path,
- wherein the refrigerant in the refrigerant storage space is configured to be circulated through the circulation flow path by the circulation pump.

5. The cooling system of claim 2, wherein the refrigerant is a fluid including one or more among molten salt and water.

* * * * *